United States Patent [19]

DeCell et al.

[11] Patent Number: 4,674,171
[45] Date of Patent: Jun. 23, 1987

[54] HEAVY WALL DRILL PIPE AND METHOD OF MANUFACTURE OF HEAVY WALL DRILL PIPE

[75] Inventors: Alonzo L. DeCell, Houston; Gregg S. Perkin, Kingwood, both of Tex.; Peter Patarini, Paravera, Italy

[73] Assignee: LOR, Inc., Houston, Tex.

[21] Appl. No.: 602,385

[22] Filed: Apr. 20, 1984

[51] Int. Cl.⁴ .................................................. B23P 13/00
[52] U.S. Cl. .............................. 29/558; 29/DIG. 18; 72/340; 72/368; 138/172; 138/177; 175/320; 285/333
[58] Field of Search ................. 29/558, DIG. 18, 557; 72/340, 341, 368, 76; 166/242; 175/320; 285/333, 334; 138/177, 172

[56] References Cited

U.S. PATENT DOCUMENTS

| 443,030 | 12/1890 | Wood . |
| 455,905 | 7/1891 | Thomson . |
| 1,603,403 | 10/1926 | Potter . |
| 1,699,688 | 1/1929 | Cross ..................................... 72/340 |
| 1,699,688 | 1/1929 | Cross . |
| 1,875,362 | 9/1932 | Wells ..................................... 72/340 |
| 2,073,093 | 3/1937 | Brantly . |
| 2,259,232 | 10/1941 | Stone . |
| 2,301,495 | 10/1942 | Abegg . |
| 2,334,350 | 11/1943 | Neuhaus . |
| 2,378,738 | 6/1945 | Smith . |
| 2,562,644 | 7/1951 | Saxer . |
| 2,626,190 | 1/1953 | Boice . |
| 2,653,061 | 9/1953 | Lewis et al. . |
| 2,664,272 | 12/1953 | Boice . |
| 2,676,820 | 4/1954 | Boice ............................. 138/177 X |
| 2,720,800 | 11/1951 | Taylor . |
| 2,819,629 | 1/1958 | Robinson ....................... 72/341 X |
| 2,958,512 | 11/1960 | Humphrey . |
| 3,047,313 | 7/1962 | Bruce . |
| 3,074,767 | 1/1963 | Rosenberg . |
| 3,080,179 | 3/1963 | Huntsinger . |
| 3,098,402 | 7/1963 | Kralowetz . |
| 3,125,173 | 3/1964 | Fox . |
| 3,126,770 | 3/1964 | Wuppermann et al. . |
| 3,152,458 | 10/1964 | Simonin . |
| 3,165,012 | 1/1965 | Kralowetz . |
| 3,167,137 | 1/1965 | Humphrey . |
| 3,186,209 | 6/1965 | Friedman ......................... 72/368 X |
| 3,192,760 | 7/1965 | Timberlake ......................... 72/341 |
| 3,195,927 | 7/1965 | Kimbrell . |
| 3,224,244 | 12/1965 | Kralowetz . |
| 3,391,561 | 7/1968 | Calmes ............................. 72/368 X |
| 3,451,249 | 10/1966 | Sharon . |
| 3,458,922 | 8/1969 | Schellstede et al. . |
| 3,484,122 | 12/1969 | Schellstede et al. . |
| 3,499,210 | 3/1970 | Schellstede et al. . |
| 3,564,894 | 2/1971 | Sharon ............................. 72/368 X |
| 3,613,432 | 12/1969 | Schenk et al. . |
| 3,645,126 | 2/1972 | Kralowetz et al. . |
| 3,657,916 | 4/1972 | Paknke . |
| 3,681,966 | 8/1972 | Kralowetz et al. . |
| 3,696,651 | 10/1972 | Harrison . |
| 3,715,908 | 2/1973 | Schussler . |
| 3,773,359 | 11/1973 | Chance et al. . |
| 3,784,238 | 1/1974 | Chance et al. . |
| 3,837,209 | 9/1974 | Guse . |
| 3,841,139 | 10/1974 | Bachmann . |
| 3,916,667 | 11/1975 | Paknke et al. . |
| 3,923,324 | 12/1975 | Cruickshank et al. . |

(List continued on next page.)

FOREIGN PATENT DOCUMENTS

715195 2/1980 U.S.S.R. ............................. 72/368

Primary Examiner—Howard N. Goldberg
Assistant Examiner—Joseph M. Gorski
Attorney, Agent, or Firm—Pravel, Gambrell, Hewitt & Kimball

[57] ABSTRACT

A substantially homogeneous heavy wall drill pipe and its method of manufacture are disclosed. A cylindrical ingot is placed in a multi-hammer forging press to form the ingot into a drill pipe bar having a central protector portion and upper and lower connector sections each of larger diameter than cylindrical body sections of the drill pipe. Thereafter, the bar is straightened and upper and lower end connectors are machined. Threaded end portions are machined on the connectors and a bore is drilled through the drill pipe bar.

5 Claims, 7 Drawing Figures

U.S. PATENT DOCUMENTS

| | | | |
|---|---|---|---|
| 3,974,677 | 8/1976 | Castellani et al. | 72/340 |
| 3,989,554 | 11/1976 | Wisler . | |
| 4,084,418 | 4/1978 | Willenbrock et al. . | |
| 4,146,060 | 3/1979 | Garrett . | |
| 4,151,018 | 4/1979 | Bolton . | |
| 4,194,031 | 3/1980 | Cullum . | |
| 4,199,969 | 4/1980 | Engel et al. . | |
| 4,229,963 | 10/1980 | Savinov et al. . | |
| 4,273,159 | 6/1981 | Bolton et al. . | |
| 4,277,108 | 7/1981 | Wallace . | |
| 4,278,138 | 7/1981 | Rowley et al. . | |
| 4,310,059 | 1/1982 | Moore . | |
| 4,416,476 | 11/1983 | Garrett | 285/333 X |
| 4,510,787 | 4/1985 | Hayashi et al. | 72/368 |

HEAVY WALL DRILL PIPE AND METHOD OF MANUFACTURE OF HEAVY WALL DRILL PIPE

TECHNICAL FIELD OF THE INVENTION

The field of this invention relates to heavy wall drill pipe and the method of manufacture of heavy wall drill pipe.

BACKGROUND OF THE INVENTION

In oil and gas drilling operations, it is universally known that the drill bit is mounted at the end of a drill string which extends from the bottom of the hole being drilled up to a drilling rig. Typically, the drill string extends through a rotary table which includes the equipment for rotating the drill string and thereby rotating the drill bit at the bottom of the drill string in order to drill the hole.

Basically, there are three types of drill pipe components that can be used in a drill string. The most common type of drill pipe is known by that name and basically comprises elongated tubular pieces having a "pin" or male thread at one end and a "box" or female thread at the other end. Such standard drill pipe is typically 31 feet long and has a uniform wall thickness in a range of 0.25–0.50 inches. Another type of drill pipe is known as the "drill collar". Drill collars are much heavier than drill pipe and are typically located near the bottom of the hole. Drill collars are typically attached between the bottom of the standard drill pipe part of the drill string and the drill bit itself. Drill collars typically have a greater wall thickness than standard drill pipe and generally operate in a manner to provide weight to the bottom of the drill string to urge the drill bit downwardly.

The third form of drill pipe is known as "heavy wall drill pipe". Typically, heavy wall drill pipe is approximately 31 feet in length and includes upset end portions forming pin and box threaded connections and further has a central protector of larger diameter than the central elongated body section. U.S. Pat. Nos. 3,784,238 and 3,773,359 disclose heavy wall drill pipe or intermediate drill stem having an elongated tubular steel body terminating at either end in connectors of larger diameter and further having an intermediate protector of larger diameter located intermediately between the ends of the elongated tubular steel body. Typically, such intermediate drill stem is approximately 31 feet in length and has in its central section of uniform diameter a thickness of at least ⅝ inch. Central protectors or sections of raised or larger diameter are not wholly unique to heavy wall drill pipe. U.S. Pat. Nos. 3,484,122 and 3,458,922 disclose standard drill pipe having central protector sections.

Typically, heavy wall drill pipe is manufactured from worn out drill collars by machining the drill collar down in its central section to a section of small diameter leaving a central protector and upsets on the ends. Heavy wall drill pipe can also be manufactured using tubing which can also be turned down on the ends leaving a central protector. The upset ends for the connectors are then welded on. U.S. Pat. Nos. 3,784,238 and 3,773,359 disclose methods of manufacture of heavy wall drill pipe or intermediate drill stem. Manufacture of heavy wall drill pipe from a single piece of tubing by machining is quite undesirable from an economic standpoint due to the tremendous waste of material and machine time. Therefore, most heavy wall drill pipe has been manufactured from tubes or pipes with connector portions being added to each end. The utilization of welded on connector portions has generally been satisfactory; however, it is believed that it would be more desirable from an economical and practical standpoint to manufacture heavy wall drill pipe from an integrally formed bar.

SUMMARY OF THE INVENTION

It is an object of this invention to manufacture drill pipe in an integral form from a fully forged drill pipe bar. In summary, the method of manufacture of an integrally forged drill pipe of this invention includes the steps of placing a substantially cylindrical ingot in a multi-hammer forging press and manipulating the ingot through the press to form a substantially elongated fully forged drill pipe bar having an outside surface formed of an indeterminate number of indentations caused by the impact of the forging hammers thereon. The drill pipe bar comprises a central body section having upper and lower generally cylindrical body sections and a centrally located protector section of larger diameter and upper and lower end connector sections of larger diameter. The drill pipe bar is then straightened such that the longitudinal axis of the bar is a substantially straight line. The upper and lower end connectors of the drill pipe bar are then machined to form substantially cylindrical outside surfaces of the same outer diameter at each end of the bar. The central protector is then machined to form a generally cylindrical outside surface thereon. A bore is then machined through the bar and an interiorly threaded end portion is machined in the upper end connector and an exteriorly threaded end portion is machined on the lower end connector.

The forged drill pipe of this invention comprises a generally cylindrical tubular body formed of a forged steel, the body having a bore therethrough. The generally tubular body includes a central body portion having upper and lower body sections of substantially uniform outside diameter. A central body section includes a central protector integrally forged with the upper and lower body sections. The central protector has a portion of a larger outside diameter than the substantially uniform outside diameter of the upper and lower body sections. An upper connector section is integrally forged with the upper body section. The upper connector section has a larger outside diameter than the outside diameter of the upper body section and has an interiorly threaded end portion in the body bore. A lower connector section is integrally forged with the lower body section. The lower connector section has a portion of larger outside diameter than the substantially uniform diameter of the lower body section and has a threaded end portion exterior to the body bore.

DESCRIPTION OF THE PREFERRED EMBODIMENT

Referring to the drawings, the letter H designates the heavy wall drill pipe of the preferred embodiment of this invention. The heavy wall drill pipe H is manufactured according to the process illustrated in FIGS. 2-5. Basically, the heavy wall drill pipe H is formed of a generally tubular body generally designated as 10 of a forged steel. The generally tubular body 10 has a bore 10a there through. The body 10 includes a central body section generally designated as 11, which body section includes an upper central body section 11a and a lower central body section 11b. The central body sections 11a and 11b are of substantially uniform diameter.

Figures 1, 1A:
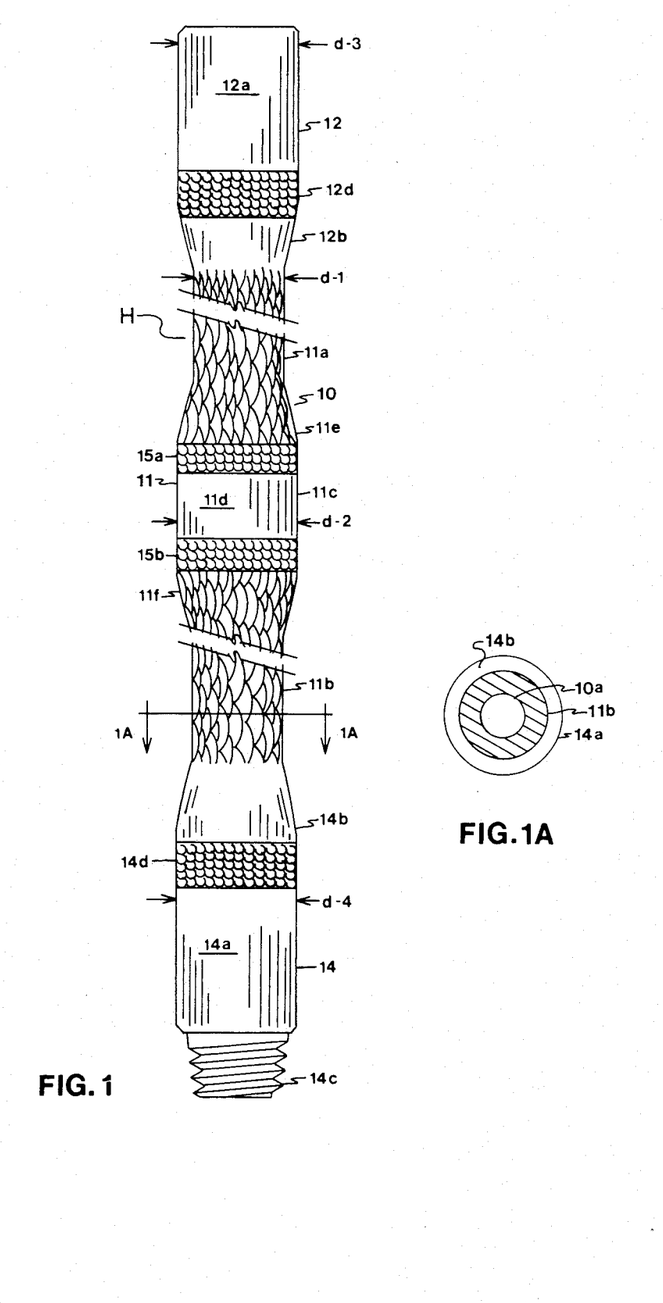
FIG. 1 is a side view of the heavy wall drill pipe of the preferred embodiment of this invention illustrating the virtually entirely forged outside surface of the pipe.
FIG. 1A is a sectional view taken through the heavy wall drill pipe along line 1A—1A of FIG. 1.

The central body section 11 further includes a central protector 11c integrally formed with the upper and lower body sections. The central protector 11c includes a cylindrical portion 11d of a diameter d-2 greater than the diameter d-1 of the upper and lower body sections 11a and 11b, respectively.

The central protector cylindrical portion 11d is joined to the upper body section 11a by an upper tapered portion 11e which tapers from the diameter d-2 of the protector cylindrical portion 11d to the diameter d-1 of the upper body section 11a. Similarly, a lower tapered portion 11f extends from the cylindrical portion or surface 11d of the central protector and joins the diameter d-1 of the lower body section 11b.

The heavy wall drill pipe H further includes an upper connector section generally designated as 12 and a lower connector section generally designated as 14. The upper connector section 12 and the lower connector section 14 are both integrally formed with the upper and lower body sections 11a and 11b, respectively, such that the heavy wall drill pipe H is a substantially homogeneous and integrally formed product.

The upper connector section 12 includes a cylindrical portion 12a having a diameter d-3 larger than the diameter d-1 of the central body sections 11a and 11b. The upper connector section 12 portion 12a is machined and a tapered portion 12b is machined and extends from the cylindrical portion 12a into and joins with the upper body section 11a. The upper connector section 12 is known as the "box" end of the heavy wall drill pipe H and has an interiorly threaded section 12c (FIG. 5) adapted to receive a screwed-in "pin" section of another heavy wall drill pipe joint or typical, thin walled drill pipe, drill collars, or other drill stem components.

Figure 5:
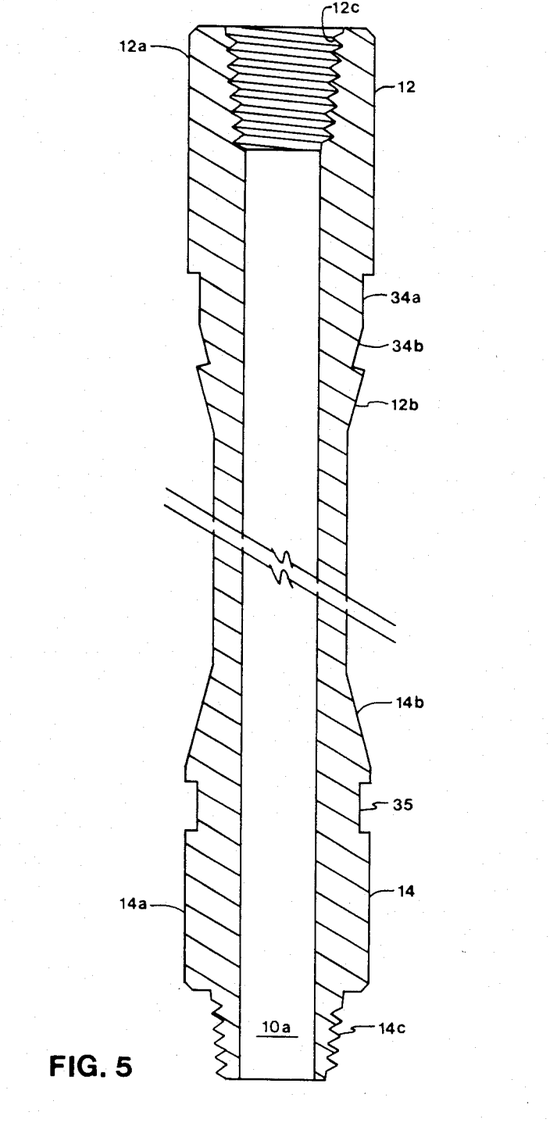
FIG. 5 is a side view in section illustrating the pin and box end connections on the end connectors of the heavy wall drill pipe and further illustrating the grooves machined in the end connectors for hard banding.

The lower connector section 14 of the heavy wall drill pipe H includes a machined cylindrical portion 14a and a tapered portion 14b which is also machined. The cylindrical portion 14a has a diameter d-4 equal to the d-3 of the upper connector section 12 and thus greater than the diameter d-1 of the upper and lower sections of 11a and 11b, respectively. The lower connector section 14 is the "pin" of the heavy wall drill pipe H and therefore includes an exteriorly threaded portion 14c adapted to be screwed into a box or upper connector section 12 of another piece of heavy wall drill pipe, drill collar, or other drill stem component.

The upper connector cylindrical section 12a, the central protector cylindrical section 11d and the lower connector cylindrical section 14a are all machined, cylindrical surfaces. A lower portion 12d of the upper connector cylindrical surface 12a is hardbanded with a hard metal alloy. Part of the tapered surface 12b extending down to upper body section 11a is also hardbanded. Upper and lower portions 15a and 15b, respectively, of the central protector cylindrical section 11d are hard banded; and, an upper portion 14d of the lower connector section cylindrical portion 14a is hard banded.

The remainder of the exterior surface of the heavy wall drill pipe H other than the machined cylindrical and tapered portions 12a, 12b, 11d, 14a and 14b and hardbanded portions or zones 12d, 15a and 15b and 14d is dimpled or indented in surface appearance. This dimpled appearance is caused by the virtually indeterminate number of dimples or indentations formed in the exterior surface of the heavy wall drill pipe as a result of the forging technique utilized to manufacture the heavy wall drill pipe.

The length of the heavy wall drill pipe H is nominally 31 feet. The length of the upper connector 12 is at least 20 inches and the length of the lower connector is at least 27 inches. The length of the central protector section 11 is at least 18 inches. The thickness of the heavy wall drill pipe in its upper and lower body sections having outer diameter d-1 is at least ⅝ inch thick, which is of course, thicker than the normal thickness of regular service drill pipe. The following table lists dimensions for some common connection sizes of the heavy wall drill pipe H:

| Nominal Pipe Size | End Connector O.D. | Central Protector O.D. | Tool Joint & Pipe I.D. |
|---|---|---|---|
| 3½ | 4¾ | 4¾ | 2 3/16 |
| 4 | 5¼ | 5¼ | 2 11/16 |
| 4½ | 6¼ | 6¼ | 2⅞ |
| 5 | 6½ | 6½ | 3⅛ |

Heavy wall drill pipe is manufactured in a manner to be described hereinafter of a forgeable steel such as 4145H.

As previously described, to date heavy wall drill pipe has been principally manufactured from worn drill collars or tubing. The main body section of such heavy wall drill pipe was machined from such worn drill collars or tubing and upper and lower connector sections were added by welding. If heavy wall drill pipe was manufactured from bar stock, it was totally machined from such bar stock.

Heavy wall drill pipe H of the preferred embodiment of this invention is manufactured by a forging process such that the heavy wall drill pipe H is an integral piece of steel having no welds. The method of manufacture of heavy wall drill pipe H is illustrated in FIGS. 2-5.

Figures 2, 2A:
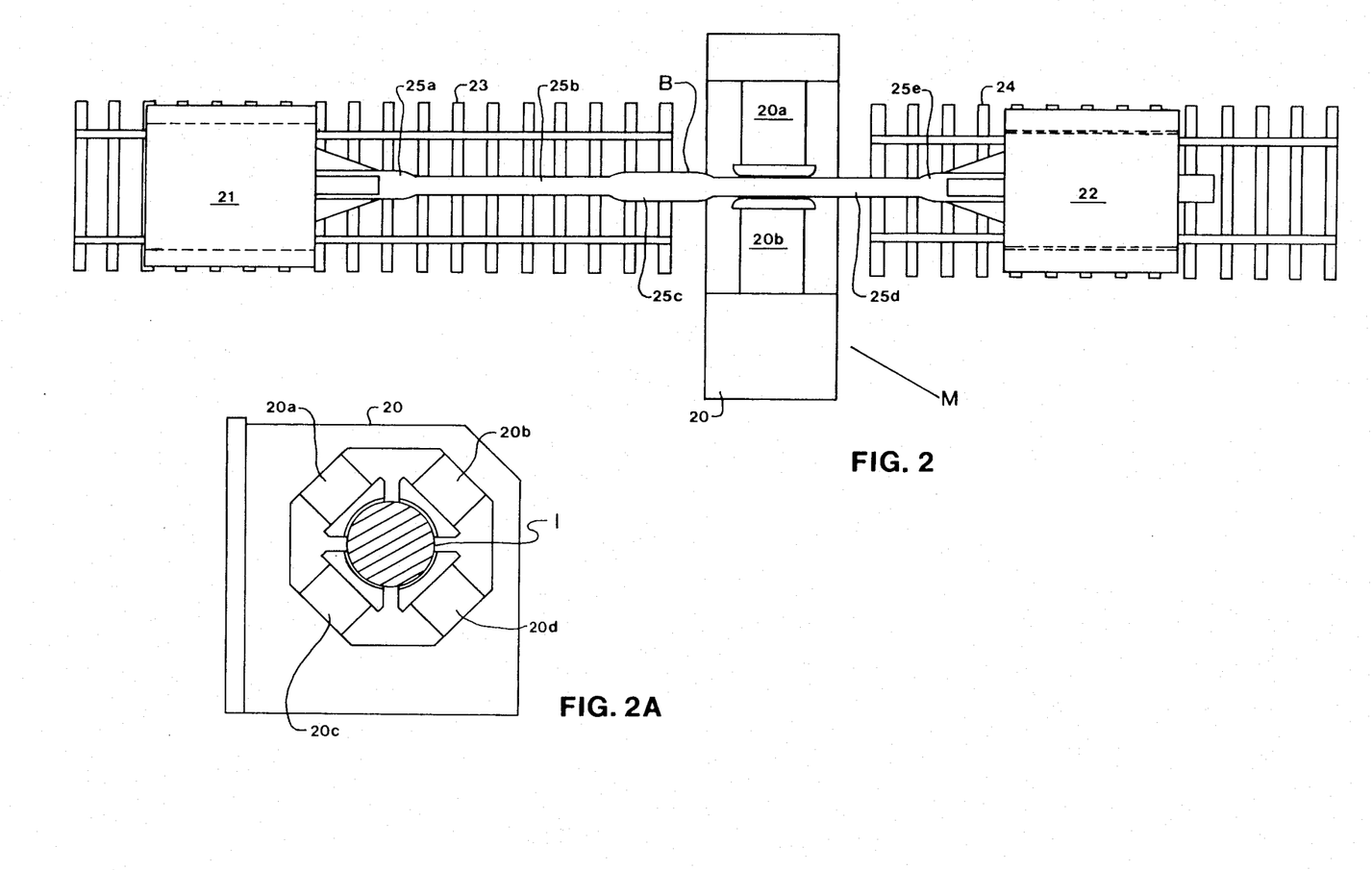
FIG. 2 is a top view in schematic of the four-way forging machine utilized to manufacture the heavy wall drill pipe bar of this invention.
FIG. 2A is a side view in schematic illustrating the multi-impact forging action of the four-way forging press utilized to manufacture the heavy wall drill pipe of this invention.

Referring to FIGS. 2 and 2a, a four-way forging machine M is illustrated. The four-way forging machine M includes a central press section 20 illustrated in FIGS. 2 and 2a. Of course, the illustrations of FIGS. 2 and 2a are schematic of such a forging machine. Generally speaking, the forge press section of the forging machine M includes a housing and mechanism for mounting four forging hammers 20a, 20b, 20c and 20d for rapid reciprocated and coordinated hammer movements against an ingot I. The forging machine M further includes manipulating Sections 21 and 22 which are mounted onto rail sections 23 and 24 located on either side of the forge press 20 for the purpose of holding the ingot I and moving the ingot relative to the forge press 20 and the hammers 20a–20d.

Such forging machines M are known in the art. U.S. Pat. Nos. 443,030; 3,098,402; 3,165,012; 3,224,244; 3,645,126 and 3,681,996 all disclose various aspects of such four-way forging machines. In each instance, the four hammers or rams are located at 90° positions and various types of driving mechanisms, hydraulic or strictly mechanical, are provided for reciprocating the hammers radially with respect to the ingot I. Additionally, it is the state of the art to provide coordinated control means to coordinate the movement of the manipulators 21 and 22 in conjunction with the rapid hammering of the forging hammers 20a–20d in order to forge the ingot I to a desired configuration. It should be understood that other multiple hammer forging machines can also be utilized. In the preferred embodiment of this invention, the ingot I is a somewhat elongated cylindrical ingot having approximately a volume of material which would at least equal the volume of the solid, forged heavy wall drill pipe. The ingot I is held by one of the manipulators 21 or 22 at a time and the ingot I is moved longitudinally through the forging press 20 in a series of planned movements to forge out a heavy wall drill pipe bar B such as illustrated in FIG. 2.

The heavy wall drill pipe bar B basically has the same configuration as the finished heavy wall drill pipe product of H of FIG. 1. The heavy wall drill pipe bar B is totally forged and solid. The bar B is a substantially elongated tubular member having a first connector section of enlarged diameter 25a, a first intermediate body section of a smaller, uniform diameter 25b, a central protector section 25c of larger diameter, a second central body section 25d of a smaller diameter and, finally, a second end protector section 25e of larger diameter. The outer diameter of the connector sections 25a and 25e is somewhat larger than the final diameter of the machined cylindrical portions 12a and 14a, respectively. Comparing the bar B to the final heavy wall drill pipe H, the first central body section 25b of the bar exactly corresponds to the upper body section 11a of the heavy wall drill pipe H. Similarly, the second body section 25d of the bar corresponds to the lower body section 11b of the heavy wall drill pipe H.

Figure 3:
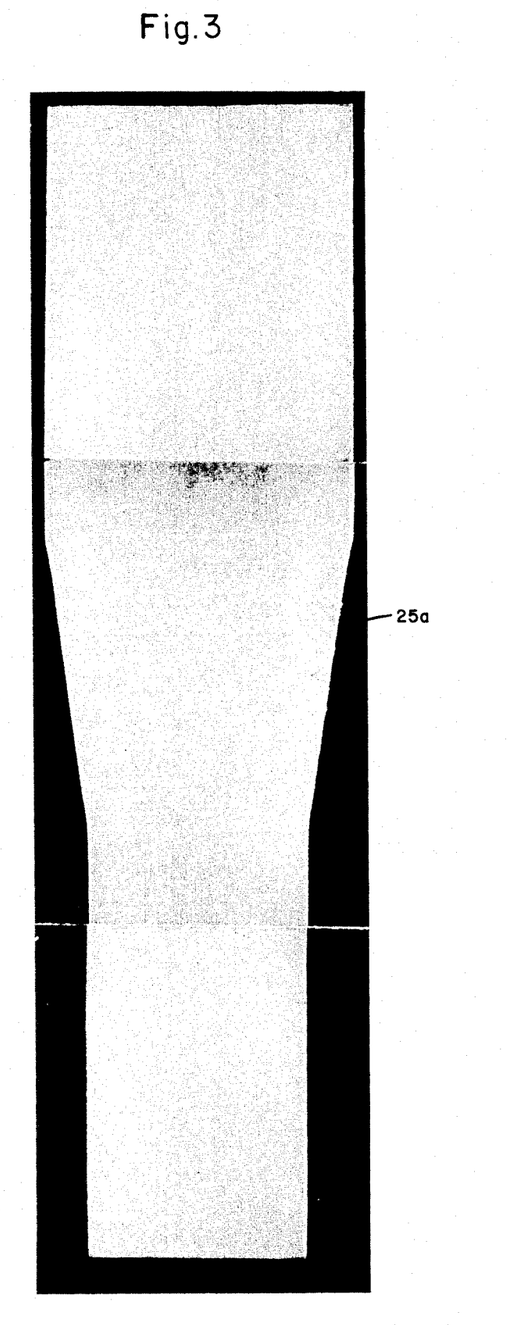
FIG. 3 is a photograph illustrating the microstructure of the fully forged heavy wall drill pipe bar.

Referring to FIG. 3, a photograph is illustrated of the microstructure of the heavy wall drill pipe bar B. As the photograph illustrates, the microstructure in the bar B is quite uniform and further, the microstructure generally follows the contour of the outer surface of the bar B in its area of enlarged diameters such as the end portion 25a shown in FIG. 3. This uniform microstructure is a result of integrally forging the bar B and heat treating the bar B as a whole. After the heavy wall drill pipe bar B has been fully forged in the forging machine M, the bar B is heat treated in its entirety in order to provide the uniform microstructure.

After the heavy wall drill pipe bar B has been heat treated, the bar B is then straightened in a typical pipe straightening machine such that the longitudinal axis L (FIG. 4) of the bar B is virtually a straight line. Such pipe straightening steps are well known in the art and any type of pipe straightening equipment may be utilized.

Figure 4:
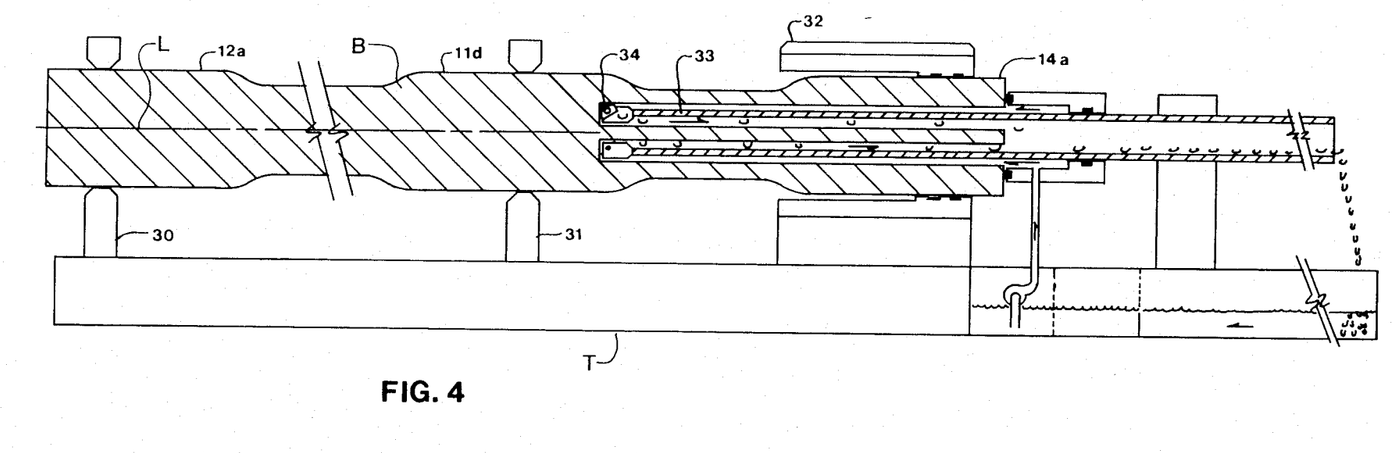
FIG. 4 is a side view in schematic illustrating the boring of the central bore in the heavy wall drill pipe bar.

Before the bore 10 is drilled or machined through the heavy wall drill pipe bar B, cylindrical surfaces 12a, 11d and 14a are machined. Referring to FIG. 4, a boring machine known as a "treepanning" machine is illustrated schematically. In order to illustrate the operation of the treepanning machine T, the actual size of the heavy wall drill pipe bar B is illustrated as being disproportionately large as to compared to the treepanning machine T. The machined surfaces 12a, 11d and 14a are shown. In order to properly bore the bore hole 10a, it is necessary for the cylindrical machined surfaces 12a, 11d and 14a to be aligned along the axis. It is also necessary for the forged cylindrical surfaces 11a and 11b to be aligned along the same aforementioned axis. The diameter of the connector surface 12a, which is d-3, is equal to the diameter of the connector surface 14a, which is d-4. Thus the surfaces 12a and 14a are in the same cylindrical plane. The diameter d-2 for the central protector cylindrical portion 11d is equal to or less than the diameters d-3 and d-4 and therefore the cylindrical surface 11d is in the same cylindrical plane or a plane concentric with the surfaces 12a and 14a.

Basically, the treepanning machine T may be any suitable variety of machine capable of boring the bore hole 10 through the heavy wall drill pipe bar B. One such machine is manufactured by LaBlonde Company. Typically, a treepanning machine such as T illustrated in FIG. 4 includes a first support means 30 for engaging the cylindrical surface 12a and a second support means 31 for engaging the cylindrical surface 11d of the protector section of the bar B. A third support means or station illustrated schematically as 32 supports the bar at the surface 14a and further includes means for rotating the entire bar B. A boring device including a boring rod 33 having a boring bit 34 attached thereto is mounted for rotation and longitudinal movement into the bar B along the longitudinal axis L of the bar. As the bar B is rotated, the boring rod 33 is advanced by a suitable mechanism into the bar and fluid is circulated through the bar bore hole as it is created to remove the cuttings. In the treepanning machine T utilized, approximately one-half of the bore 10 is machined in one side of the bar B, and, the bar B is then removed and remounted in the opposite direction so that the remaining bore can be drilled or machined.

Referring to FIG. 5, the interior box thread 12c is machined into the upper connector 12 and the exterior, pin thread 14c is machined into the bottom end of the cylindrical surface 14a of the lower connector 14.

The heavy wall drill pipe bar is then hard banded. The box end 12 has a groove formed at 34a partly in the cylindrical section 12a and at 34b partly in the tapered section 12b. Similarly, grooves (not shown) are formed in the upper and lower portions of the central protector in order to provide the hard banding at 15a and 15b as illustrated in FIG. 1. And, a groove 35 is machined in the cylindrical surface 14a of the lower connector 14. Hard banding alloy is then welded into these grooves in a manner known to the art. In accordance with known hard banding techniques, hard banding material is added into the grooves such as 35 using MIG welding techniques to weld into the groove, for example, a combination of a mild steel having tungsten carbide pellets therein to create the hard banded areas. Thereafter, the hard banded areas are heat treated in order to temper the area near the grooves which may have been somewhat hardened as a result of the heat applied by welding.

The heavy wall drill pipe H is thus manufactured from a one piece forged steel bar, which steel bar is forged to the overall configuration of the final pipe product itself. Comparing the heavy wall drill pipe P to heavy wall drill pipe such as manufactured in accordance with U.S. Pat. No. 3,784,238, the heavy wall drill pipe H of the preferred embodiment of this invention has no welds and the only machined exterior surfaces are the cylindrical surfaces 12a, 11d and 14a and tapered surfaces 12b and 14b. Other than these machined surfaces and the hard banding at zones 12d, 15a, 15b and 14d, the entire remaining exterior surface of the heavy wall drill pipe P is indented or pocked as originally forged. Therefore, the heavy wall drill pipe H is made with a minimum of machining on its exterior surface and additionally, has a very consistent microstructure as a result of being manufactured from an integrally forged bar.

The foregoing disclosure and description of the invention are illustrative and explanatory thereof, and various changes in the size, shape and materials, as well as in the details of the illustrated construction may be made without departing from the spirit of the invention.

We claim:

1. A method of manufacturing an integrally forged heavy wall drill pipe having a length nominally of about 31 feet and an outside diameter nominally of between about 3½ inches and 5 inches and a bore therethrough, comprising the steps of:

placing an ingot in a multi-hammer forging press and manipulating said ingot through said press while operating the hammers on said ingot, thereby forming a substantially elongated fully forged drill pipe bar having upper and lower generally cylindrical body sections each having an outside surface of substantially uniform diameter and a longitudinal axis, a central protector section of larger diameter than said substantially uniform diameter of said upper and lower body sections and being located between said upper and lower body sections, and upper and lower end connector sections of larger diameter than said substantially uniform diameter of said upper and lower generally cylindrical body sections, and thereby forming the entire outside surface of said bar of an indeterminate number of indentations formed by the forging hammers;

heat treating said fully forged drill pipe bar as a whole such that said bar has a substantially uniform microstructure;

straightening said bar such that the longitudinal axes of said upper and lower body sections of said bar form a substantially straight line;

machining said upper and lower end connector sections, thereby forming a generally cylindrical outside surface on each section having an outer diameter of equal size;

machining a generally cylindrical outside surface on said central protector section;

machining a bore of uniform diameter entirely through said bar;

machining an interiorly threaded end portion on said upper end connector section and an exteriorly threaded portion on said lower connector section;

machining said cylindrical surfaces on said upper and lower end connector and said central protector section in concentric cylindrical planes; and machining a tapered surface below said generally cylindrical machined outside surface of said upper connector section, and leaving the indentations on a substantial part of said outside surface of said fully forged drill pipe bar between said central protector section and each of said connector sections, thus leaving said substantial part in its originally forged condition for ultimate use without further machining.

2. The method set forth in claim 1, further comprising:

machining said bore of uniform diameter in said drill pipe bar by mounting and rotating said bar with said cylindrical outside surfaces machined on said central protector and upper and lower end connector sections, and first boring from one end connector section inwardly and then boring from the other end connector section inwardly, thereby completing a uniform interior bore in said heavy wall drill pipe bar.

3. The method set forth in claim 1 further comprising the step of:

hard banding a portion of said generally cylindrical outside surfaces of said upper and lower end connector sections.

4. The method set forth in claim 1, including the steps of:

machining a hard banding groove partly in said generally cylindrical surface of said upper end connector section and partly in said tapered surface machined below said generally cylindrical outside surface of said upper end connector section; and depositing hard banding alloy into said hard banding groove, thereby providing a hard banding outside surface which is partly cylindrical and partly tapered.

5. The method set forth in claim 4 including the step applying a second heat treat to said drill pipe bar after said hard banding, thereby tempering said bar near said groove.

* * * * *

UNITED STATES PATENT AND TRADEMARK OFFICE
CERTIFICATE OF CORRECTION

PATENT NO. : 4,674,171

DATED : June 23, 1987

INVENTOR(S) : Alonzo L. DeCell, Gregg S. Perkin, Peter Patarini

It is certified that error appears in the above-identified patent and that said Letters Patent is hereby corrected as shown below:

In Column 8, line 3, following the word "each", insert therefor --connector--.

Signed and Sealed this

Ninth Day of August, 1988

Attest:

DONALD J. QUIGG

*Attesting Officer*  *Commissioner of Patents and Trademarks*